United States Patent
Rubinoff

(10) Patent No.: US 9,624,721 B2
(45) Date of Patent: Apr. 18, 2017

(54) LAMINATE SCREEN FOR A ROLLER BLIND

(71) Applicant: Hunter Douglas, Inc., Pearl River, NY (US)

(72) Inventor: Ronald S. Rubinoff, Plantation, FL (US)

(73) Assignee: Hunter Douglas, Inc., Pearl River, NY (US)

(*) Notice: Subject to any disclaimer, the term of this patent is extended or adjusted under 35 U.S.C. 154(b) by 0 days.

(21) Appl. No.: 14/234,004

(22) PCT Filed: Mar. 13, 2013

(86) PCT No.: PCT/US2013/030770
§ 371 (c)(1),
(2) Date: Jan. 21, 2014

(87) PCT Pub. No.: WO2013/138435
PCT Pub. Date: Sep. 19, 2013

(65) Prior Publication Data
US 2015/0337592 A1   Nov. 26, 2015

(51) Int. Cl.
*A47G 5/02* (2006.01)
*A47H 1/00* (2006.01)
(Continued)

(52) U.S. Cl.
CPC .................. *E06B 9/42* (2013.01); *E06B 9/40* (2013.01); *Y10T 156/1052* (2015.01)

(58) Field of Classification Search
CPC ..... E06B 9/42; E06B 9/40; B25B 5/00; B25B 5/022
(Continued)

(56) References Cited

U.S. PATENT DOCUMENTS 4,130,614 A     12/1978   Saidla
4,220,500 A *   9/1980    Baba ..................... B29C 70/00
                                                            162/127
(Continued)

FOREIGN PATENT DOCUMENTS

WO     WO 9909868 A1    3/1999

OTHER PUBLICATIONS

Article—Edward M. Petrie, "Paste Dot Adhesives for Bonding Nonwovens," Oct. 1, 2005, 5 pages, www.adhesivesmag.com.
(Continued)

*Primary Examiner* — Katherine Mitchell
*Assistant Examiner* — Jeremy Ramsey
(74) *Attorney, Agent, or Firm* — Dority & Manning, P.A.

(57) ABSTRACT

A roller blind assembly is described that is made at least in part with a laminate material that includes a roller blind screen and a non-woven backing material applied to the roller blind screen by pressure or heat. If an adhesive is used, the adhesive can be applied to the front side of the non-woven backing material, after which the front side of the non-woven backing material is then attached or bonded to the rear side of the roller blind screen to form the roller blind laminate material. When placed in an architectural opening, such as a window, the roller blind laminate material can reduce or diffuse the light transmission in a room to create a diffused, opaque, or shielded view to the outside while still providing a warm ambiance to an architectural structure or room.

21 Claims, 6 Drawing Sheets

(51) Int. Cl.
*E06B 9/42* (2006.01)
*E06B 9/40* (2006.01)

(58) Field of Classification Search
USPC .................................................. 160/230, 237
See application file for complete search history.

(56) References Cited

U.S. PATENT DOCUMENTS

| | | | |
|---|---|---|---|
| 4,789,582 A * | 12/1988 | Brill | A47H 13/14 |
| | | | 160/237 |
| 4,994,317 A | 2/1991 | Dugan et al. | |
| 5,443,563 A * | 8/1995 | Hindel | E06B 9/40 |
| | | | 160/238 |
| 5,871,604 A | 2/1999 | Hohman | |
| 6,161,607 A * | 12/2000 | de Kimpe | E06B 9/40 |
| | | | 160/121.1 |
| 7,059,378 B2 | 6/2006 | Colson et al. | |
| 7,117,917 B2 | 10/2006 | Allsopp | |
| 7,699,954 B2 | 4/2010 | Colson et al. | |
| 7,740,047 B2 | 6/2010 | Koop et al. | |
| 7,763,556 B2 | 7/2010 | Nguyen et al. | |
| 7,776,767 B2 | 8/2010 | Crouzet | |
| 7,806,160 B2 | 10/2010 | Byeon | |
| 7,980,288 B2 | 7/2011 | Judkins | |
| 7,997,035 B2 | 8/2011 | Weaver | |
| 2004/0020604 A1 * | 2/2004 | Allsopp | B32B 5/26 |
| | | | 160/84.04 |
| 2004/0149396 A1 | 8/2004 | Colson et al. | |
| 2004/0224584 A1 | 11/2004 | Broadway | |
| 2005/0159058 A1 | 7/2005 | Christou et al. | |
| 2005/0215147 A1 * | 9/2005 | Masters | D04B 21/00 |
| | | | 442/59 |
| 2006/0113042 A1 | 6/2006 | Colson et al. | |
| 2006/0180278 A1 | 8/2006 | Colson et al. | |
| 2007/0077843 A1 | 4/2007 | Harkenrider et al. | |
| 2008/0176051 A1 * | 7/2008 | Nguyen | B32B 5/02 |
| | | | 428/219 |
| 2009/0308548 A1 * | 12/2009 | Tramontina | B01D 39/1623 |
| | | | 160/405 |
| 2010/0159190 A1 | 6/2010 | Milburn | |

OTHER PUBLICATIONS

Article—Edward C. Gregor, "Primer on Monofilament Woven Fabric Filtration Media," 2003, Edward C. Gregor & Associates, LLC, 4 pages.
Product Information on Vestamelt from Evonik Industries, 4 pages.
Search Report and Written Opinion for PCT/US2013/030770 dated Jun. 6, 2013, 12 pages.

* cited by examiner

LAMINATE SCREEN FOR A ROLLER BLIND

BACKGROUND

Various different coverings exist for architectural openings such as doors, windows and the like. The coverings, for instance, can provide privacy, can block views from outside, can provide thermal insulation, and/or can be aesthetically pleasing. One type of covering is referred to as a blind. Although blinds can take many different forms, blinds typically include a fabric or other material that is designed to be suspended adjacent to the top of an architectural opening by hardware that may be capable of raising and lowering the fabric.

The covering, such as a roller blind, can be configured to be raised and lowered in numerous ways. For instance, roller blinds typically include a blind material that winds and unwinds on a rotating mandrel for retracting and extending the blind. Other blinds include Roman blinds that hang flat when lowered and pleated blinds that include horizontal fold lines that allow the blind to collapse into a uniform stack when retracted. Another type of blind is typically referred to as a cellular blind. Cellular blinds are made from a series of connected foldable cells.

One of the advantages to installing a blind within an architectural opening is the ability to select a blind material or fabric that lets a desired amount of light to pass through the blind. For instance, in one embodiment, a blind material may be selected that completely blocks light from entering through the architectural opening. In an alternative embodiment, a blind material may be selected that allows a small amount of light to pass through the material for allowing some light to enter through the architectural opening while also providing visual appeal. In still another embodiment, a blind material may be selected that allows a substantial amount of light to pass through the architectural opening. Such materials are typically referred to as "sheer" materials, which can be made with a relatively open weave and can be constructed from woven or knit monofilament yarns.

Although the type of blind selected can control the amount of light transmission to some extent, a need exists to better control the amount of light transmission and to diffuse the light to create a more pleasing environment in an area utilizing a roller blind. At the same time, a need also exists to better control the amount of solar energy that passes through the roller blind to reduce energy costs and limit damage to furniture, fabrics, and other items exposed to sunlight.

Different methods and techniques for altering or reducing light transmission when constructing blind products have been proposed. For instance, U.S. Pat. No. 7,059,378 discloses blinds made for light control where fabric vanes are adhesively bonded between two sheer fabric sheets in a manner that biases the fabric sheets together to the non-light admitting position. U.S. Pat. No. 7,806,160 describes using two layers of a thick material with transparent and opaque sections to control the amount of light in a room. Additionally, U.S. Pat. No. 7,980,288 discloses blinds made for light control having a series of slats connected between two spaced apart sheets of material. U.S. patent application Ser. No. 11/020,305, published as U.S. Patent Application Publication Number 2005/0159058, meanwhile, describes the use of a titanium dioxide coating applied to glass yarn to attenuate the passage of light. While the prior art describes the use of various configurations of slats to alter light transmission in blinds, the prior art does not disclose the use of a non-woven material as a backing to roller blind fabric or material to decrease the light transmission and diffuse light as does the present disclosure.

The present disclosure is directed to further improvements in roller blind products containing laminate materials. More particularly, the present disclosure is directed to applying a non-woven material to a roller blind screen in order to control light transmission, which, for example, allows for a more aesthetically pleasing atmosphere by diffusing the view through the blind, and to control the solar energy that is allowed to pass through the roller blind screen.

SUMMARY

The present disclosure is generally directed to a roller blind assembly. In one particular embodiment, the roller blind assembly can include a mounting system, a rotating mandrel, and a roller blind laminate material. The roller blind laminate material can be configured to retract and extend by winding and unwinding on the rotating mandrel. A roller blind screen and non-woven backing material can form the roller blind laminate material. The roller blind laminate material can reduce the amount of light transmitted through the roller blind assembly and can diffuse the view through the roller blind assembly to create a more pleasing ambiance in an area or room. In one embodiment, for example, the non-woven backing material diffuses the view through the roller blind laminate material by an amount of from about 10% to about 70%.

In another embodiment, the roller blind screen can be a mesh, a monofilament fabric, or a perforated film. In addition, the roller blind screen can be formed from a glass fiber reinforced plastic having a basis weight of from about 100 grams per square meter to about 1000 grams per square meter. In yet another embodiment, the roller blind screen can have an openness factor of from about 1% to about 30%.

In yet another embodiment, the non-woven backing material can be a hydroentangled material, a spunbond material, or a meltblown material. In one embodiment, the nonwoven backing material can include polyester. In still another embodiment, the non-woven backing material can include natural fibers in an amount of from about 10% to about 30% and synthetic fibers in an amount of from about 70% to about 90%. In a further embodiment, the natural fibers can include wood pulp and the synthetic fibers can include polyolefin or polyester fibers. In still another embodiment, the non-woven backing material can have a basis weight of from about 5 grams per square meter to about 100 grams per square meter. Additionally, in another embodiment, the roller blind screen can have a thickness of from about 0.05 millimeters to about 0.50 millimeters, and the non-woven backing material can have a thickness of from about 0.05 millimeters to about 0.50 millimeters.

In still another embodiment, the roller blind assembly can include an adhesive layer that is disposed between the roller blind screen and the non-woven backing material. The adhesive layer can be a paste dot layer, a glue web, or a glue film, for example. Further, the adhesive layer can be applied to a front side of the non-woven backing material, such as in an amount of from about 2.5 grams per square meter to about 35 grams per square meter.

In one embodiment, the non-woven backing material can be attached to the roller blind screen by contacting the front side of the non-woven backing material with a rear side of the roller blind screen, wherein heat and pressure are applied to the roller blind screen and the non-woven backing material to form the roller blind laminate material so that the adhesive can be melted to attach the non-woven backing material to the roller blind screen.

In still another embodiment, the adhesive can be a thermoplastic powder and a water matrix. The thermoplastic powder can include a polyurethane, a polyolefin, a polyester, a copolyester, a polyvinyl chloride, a polyamide, or a copolymer thereof.

In one embodiment, the roller blind screen can have an openness factor of about 5%, and the light transmission through the roller blind laminate material can reduced by an amount of from about 10% to about 40% compared to the roller blind screen alone. In a different embodiment, the roller blind screen can have an openness factor of about 10%, and the light transmission through the roller blind laminate material can be reduced by an amount of from about 30% to about 70% compared to the roller blind screen alone.

In yet another embodiment, the light transmission through the roller blind screen can be from about 10 to about 50 foot-candles, while the light transmission through the roller blind laminate material can be from about 5 to about 40 foot-candles. In one more embodiment, the non-woven backing material can be associated with a reduction in a solar heat gain coefficient of the roller blind assembly of from about 10% to about 50% when determined through a section of clear glass having a width of 4 millimeters.

A method of forming a roller blind assembly is also disclosed herein. The roller blind assembly can include a roller blind mounting system, a rotating mandrel, and a roller blind laminate material configured to retract and extend by winding and unwinding on the rotating mandrel. The roller blind laminate material, can includes a roller blind screen laminated to a non-woven backing material. The non-woven backing material can diffuse the view through the roller blind laminate material by an amount of from about 10% to about 70%. The method can include laminating the non-woven backing material to the roller blind screen to form the roller blind laminate material; cutting the roller blind laminate material to a desired length and width; attaching the roller blind laminate material onto the rotating mandrel; and attaching the rotating mandrel to the roller blind mounting system.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
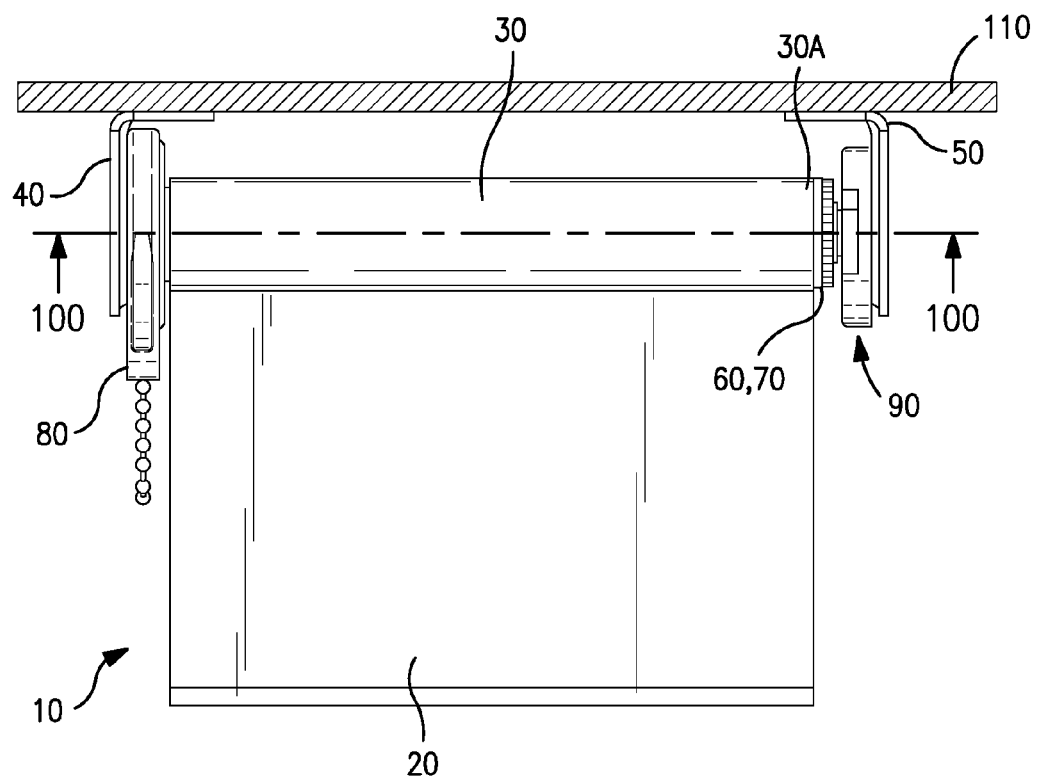
FIG. 1 is a schematic perspective view of a roller blind assembly utilizing the roller blind laminate material.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a roller blind assembly that can include a roller blind laminate material comprising a roller blind screen joined with a non-woven backing material. An embodiment of the roller blind assembly is shown in FIG. 1. The non-woven backing material can face the exterior of an architectural opening such as a window or door in order to reduce the light transmission through the roller blind assembly while the roller blind screen can face the interior of an architectural opening such as a window or door. The use of the non-woven backing material in conjunction with the roller blind screen is desirable in that it allows sufficient light to pass through the material while also providing the interior of a home or building with some privacy. In addition, the non-woven backing material has the ability to provide for a uniform reduction in light transmission across the roller blind laminate material, which can provide a room with a distinctive amount of lighting with a diffused view or softness that ultimately makes the room feel more inviting and comfortable. For instance, when the roller blind screen is used alone, distinct images can be seen through it. However, when the screen is used in combination with the non-woven backing material, only silhouettes, rather than distinct images, can be seen.

When referring to the placement of the roller blind assembly in an architectural opening, the front side of the roller blind screen faces the interior of the room where the architectural opening is located while the rear side of the roller blind screen faces the exterior and has a non-woven backing material applied thereto, such that the non-woven backing material is the exterior-most facing portion of the roller blind assembly. With such a configuration, the non-woven backing material is visible from the exterior, while the roller blind screen material is visible from the interior of a building structure. This means that the roller blind screen materials used in multiple architectural openings in a single building structure can have various colors and/or designs, textures, or patterns, yet these distinctions are not perceptible from the exterior of the building structure because only the non-woven backing material is visible, which can be selected to be the same color so that the roller blind assemblies of the present disclosure provide exterior color uniformity, which may be desired or even required in certain commercial or residential settings.

The roller blind laminate material can also exhibit properties associated with improved energy savings and efficiency as a result of the inclusion of the non-woven backing material on the rear (exterior-facing) side of the roller blind screen material. For instance the roller blind laminate material (including both screen and non-woven backing materials) can have an increased percent solar reflectance compared to a screen material alone, and the higher the percent solar reflectance, the higher the energy savings that can be realized via the roller blind laminate material. The roller blind laminate material of the present disclosure can have a solar reflectance of from about 15% to about 90%, such as from about 20% to about 80%, such as from about 25% to about 75%. Further, compared to a screen material alone, the roller blind laminate material including the non-woven backing material can exhibit an increase in solar reflectance of from about 2.5% to about 250%, such as from about 5% to about 225%, such as from about 10% to about 200%.

In addition, the laminate material can have a reduced percent solar transmittance compared to a screen material alone, indicating that the roller blind laminate material reduces the exposure to incident solar energy and can maintain objects inside an architectural structure at a cooler temperature, which can also contribute to energy savings. The roller blind laminate material of the present disclosure can have a solar transmittance of from about 0.5% to about 30%, such as from about 1% to about 27.5%, such as from about 1.5% to about 25%. Further, compared to a screen material alone, the roller blind laminate material including the non-woven backing material can exhibit a decrease in solar transmittance of from about 10% to about 75%, such as from about 12.5% to about 70%, such as from about 15% to about 65%.

The laminate material can also have a reduced percent solar absorptance compared to a screen material alone, which can decrease the likelihood of the laminate material being damaged due to thermal stress. The roller blind laminate material of the present disclosure can have a solar absorptance of from about 5% to about 70%, such as from about 6% to about 67.5%, such as from about 7% to about 65%. Further, compared to a screen material alone, the roller blind laminate material including the non-woven backing material can exhibit a decrease in solar absorptance of from about 10% to about 50%, such as from about 12.5% to about 45%, such as from about 15% to about 40%.

The percent light transmittance and ultraviolet light transmittance can also be reduced via the application of the non-woven backing material to the roller blind screen material. The laminate material can also have a reduced percent light transmittance compared to a screen material alone, which help reduce glare due to sunlight coming through an architectural opening. The roller blind laminate material of the present disclosure can have a light transmittance of from about 0.5% to about 28%, such as from about 0.75% to about 25%, such as from about 1% to about 22%. Further, compared to a screen material alone, the roller blind laminate material including the non-woven backing material can exhibit a decrease in light transmittance of from about 10% to about 70%, such as from about 15% to about 60%, such as from about 20% to about 50%.

The laminate material can also have a reduced percent ultraviolet light transmittance compared to a screen material alone, which can decrease the likelihood of furnishings and fabrics inside an architectural structure from fading and deteriorating due to ultraviolet light exposure. The roller blind laminate material of the present disclosure can have an ultraviolet light transmittance of from about 0.5% to about 15%, such as from about 0.75% to about 14%, such as from about 1% to about 12%. Further, compared to a screen material alone, the roller blind laminate material including the non-woven backing material can exhibit a decrease in ultraviolet light transmittance of from about 20% to about 90%, such as from about 25% to about 85%, such as from about 30% to about 80%.

Moreover, the laminate material can also have reduced external and internal shading coefficients compared to a screen material alone, which indicates that the non-woven backing material enhances the ability of the roller blind assembly to reduce solar heat. The external shading coefficient refers to the coefficient when the roller blind laminate is placed on the exterior side of an architectural opening, while the internal shading coefficient refers to the coefficient when the roller blind laminate is placed on the interior side of an architectural opening. The roller blind laminate material of the present disclosure can have an external shading coefficient of from about 0.12 to about 0.32, such as from about 0.14 to about 0.30, such as from about 0.16 to about 0.28. Further, compared to a screen material alone, the roller blind laminate material including the non-woven backing material can exhibit a decrease in shading coefficient of from about 14% to about 50%, such as from about 16% to about 45%, such as from about 18% to about 40%. Meanwhile, the roller blind laminate material of the present disclosure can have an internal shading coefficient of from about 0.25 to about 0.70, such as from about 0.30 to about 0.65, such as from about 0.35 to about 0.60. Further, compared to a screen material alone, the roller blind laminate material including the non-woven backing material can exhibit a decrease in internal shading coefficient of from about 6% to about 40%, such as from about 8% to about 35%, such as from about 10% to about 30%.

Further, the laminate material can have decreased external and internal solar heat gain coefficients (SHGC) compared to a screen material alone, which indicates that the non-woven backing material aids in reducing the amount of solar heat that enters a room via an architectural opening such as a window. The value is determined for window glazings A, B, C, and D. Glazing A is a 4 millimeter (mm) clear glass with a single glazing, glazing B is a clear double glazing where each glazing is 4 mm with a 12 mm gap between the two glazings that is filled with air, glazing C is double glazing with a low emissivity coating where each glazing is 4 mm with a 16 mm gap between the two glazings that is filled with Argon, and glazing D is a reflective double glazing with a low emissivity soft coating where each glazing is 4 mm with a 16 mm gap between the two glazings that is filled with Argon.

The roller blind laminate material of the present disclosure can have an external SHGC (glazing A) of from about 0.16 to about 0.27, such as from about 0.18 to about 0.25. Further, compared to a screen material alone, the roller blind laminate material including the non-woven backing material can exhibit a decrease in external SHGC (glazing A) of from about 10% to about 50%, such as from about 15% to about 45%. Meanwhile, the roller blind laminate material of the present disclosure can have an external SHGC (glazing B) of from about 0.10 to about 0.24, such as from about 0.15 to about 0.20. Further, compared to a screen material alone, the roller blind laminate material including the non-woven backing material can exhibit a decrease in external SHGC (glazing B) of from about 10% to about 50%, such as from about 15% to about 45%. In addition, the roller blind laminate material of the present disclosure can have an external SHGC (glazing C) of from about 0.08 to about 0.18, such as from about 0.10 to about 0.16. Further, compared to a screen material alone, the roller blind laminate material including the non-woven backing material can exhibit a decrease in external SHGC (glazing C) of from about 10% to about 50%, such as from about 15% to about 45%. The roller blind laminate material of the present disclosure can also have an external SHGC (glazing D) of from about 0.06 to about 0.12, such as from about 0.08 to about 0.11. Further, compared to a screen material alone, the roller blind laminate material including the non-woven backing material can exhibit a decrease in external SHGC (glazing D) of from about 10% to about 50%, such as from about 15% to about 45%.

Furthermore, the roller blind laminate material of the present disclosure can have an internal SHGC (glazing A) of from about 0.30 to about 0.60, such as from about 0.35 to about 0.55. Further, compared to a screen material alone, the roller blind laminate material including the non-woven backing material can exhibit a decrease in internal SHGC (glazing A) of from about 5% to about 45%, such as from about 10% to about 30%. Meanwhile, the roller blind laminate material of the present disclosure can have an internal SHGC (glazing B) of from about 0.30 to about 0.30, such as from about 0.35 to about 0.55. Further, compared to a screen material alone, the roller blind laminate material including the non-woven backing material can exhibit a decrease in internal SHGC (glazing B) of from about 5% to about 45%, such as from about 10% to about 30%. In addition, the roller blind laminate material of the present disclosure can have an internal SHGC (glazing C) of from about 0.30 to about 0.50, such as from about 0.35 to about 0.45. Further, compared to a screen material alone, the roller blind laminate material including the non-woven backing material can exhibit a decrease in internal SHGC (glazing C) of from about 2.5% to about 45%, such as from about 5% to about 30%. The roller blind laminate material of the present disclosure can also have an internal SHGC (glazing D) of from about 0.20 to about 0.35, such as from about 0.25 to about 0.30. Further, compared to a screen material alone, the roller blind laminate material including the non-woven backing material can exhibit a decrease in internal SHGC (glazing D) of from about 2% to about 30%, such as from about 3% to about 20%.

In addition to the improved aesthetic and light transmission properties discussed above, the present inventor has also discovered that the addition of a non-woven backing material to a roller blind screen to form the roller blind laminate material of the present disclosure can increase the sound absorption of a roller blind laminate compared to a roller blind screen alone. For instance, the non-woven backing material can create a barrier to reduce amount of noise, in the form of sound waves, which passes through the roller blind screen and reflects off an architectural opening such as a glass window.

Turning now to the various components of the roller blind assembly, the roller blind screen can be fabricated from various materials in various colors and/or patterns. For instance, the roller blind screen can be formed from a mesh, a woven or knitted monofilament fabric, a perforated film or any other material that contains openings for allowing light to pass. The screen can be a mesh material, where the mesh material forms a semi-permeable barrier made of connected strands of metal, fiber, or other flexible/ductile materials. A mesh material is similar to a web or a net in that it has many attached or woven strands.

For example, the screen can also be formed from a monofilament fabric. Monofilament materials or fabrics are constructed from monofilament yarns. The basis weight of the monofilament material can vary from about 40 grams per square meter (gsm) (about 1 ounce per square yard) to greater than about 1017 gsm (about 30 ounces per square yard). Monofilaments are often referred to as screen fabrics. Monofilaments can be formed from a variety of polymers, such as polyester or nylon. Polypropylene, polyethylene, E-CTFE and PVDF can also be used in forming monofilaments. Monofilament yarn sizes range, in nominal diameter, from about 25 microns to about 1000 microns. Monofilament yarns tend to be more rigid their multifilament counterparts. As a result, woven monofilament fabrics are stiff, particularly when the weight per square yard is above 100-135 g/m$^2$ (3 to 4 oz/yd$^2$), yet still can be wound into a roll. Monofilament fabrics can be woven up to more than 120 inches wide. Generally, monofilament fabrics can be woven very precisely with narrow pore size distributions or larger pore size distributions.

The screen can also be formed by perforating a film. The film can be made from a material such as vinyl. After the film is manufactured, a machine is used to create thousands of holes that are aligned in a pattern on the film to permit light to pass through the film.

In another embodiment, the screen can be formed from a glass fiber reinforced plastic. Further, the glass fiber reinforced plastic can be coated with a polymer such as polyvinyl chloride such that the roller blind screen includes from about 10% to about 60% by weight, such as from about 20% to about 50% by weight, such about 35% by weight, of glass reinforced plastic by weight and from about 40% to about 90% by weight, such as from about 50% to about 80% by weight, such as about 65%, of polyvinyl chloride.

In some embodiments, the roller blind screen can have a thickness of from about 0.05 millimeters to about 0.50 millimeters, such as from about 0.10 millimeters to about 0.45 millimeters, such as from about 0.15 millimeters to about 0.35 millimeters. Further, the roller blind screen can have a basis weight of from about 100 grams per square meter (gsm) to about 1000 gsm, such as from about 175 gsm to about 825 gsm, such as from about 250 gsm to about 750 gsm.

Figure 2:
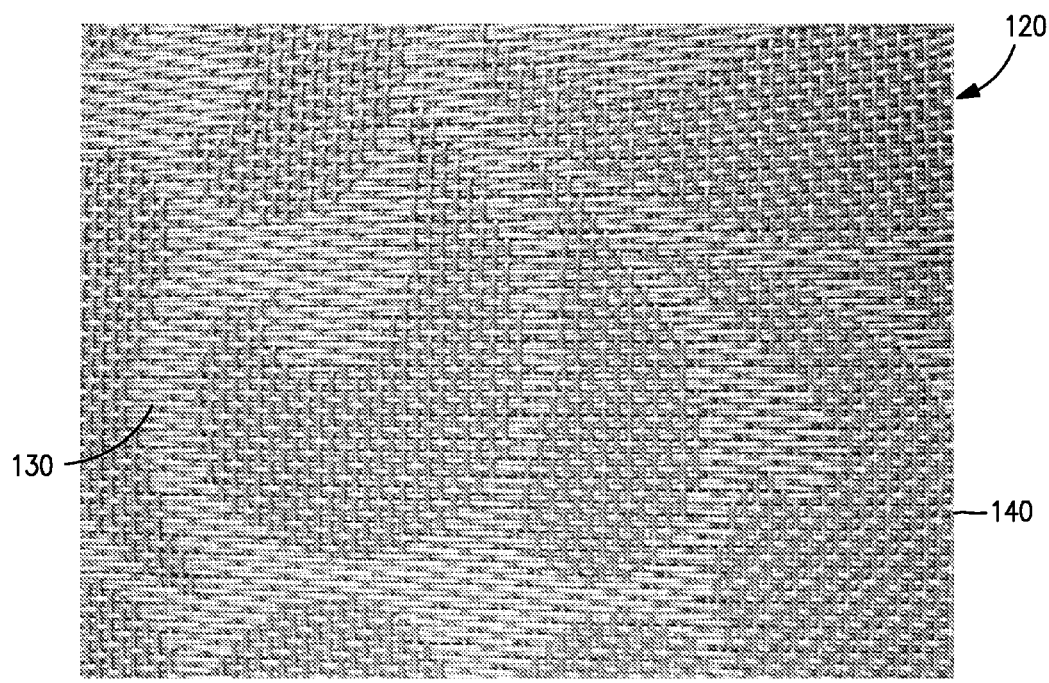
FIG. 2 is an image of a jacquard roller blind screen.

Regardless of the type of screen material used, the roller blind screen, as mentioned above, can be made from materials that come in a variety of colors. Additionally, the screen can exhibit a variety of patterns. For example, the roller blind screen can have a jacquard pattern, as shown in FIG. 2, which means that the screen can be formed from a fabric of intricate variegated weave or pattern. Referring to FIG. 2, the roller blind screen 120 has a front side 130, which faces the interior of an architectural structure, and a rear side 140, which faces the exterior of an architectural structure. Moreover, the screen can be constructed from materials having varying openness factors. A material's openness factor refers to the amount of light that is allowed through the screen, expressed as a percentage. The openness factor corresponds to the ratio of the surface area of the openings in a material, such as a roller blind screen, compared to the total surface area of the material. A lower openness factor increases the amount of light that can be blocked by the screen, while also causing the view through the screen to not be as clear. A higher openness, on the other hand, decreases the amount of light that can be blocked by the screen, while also causing the view through the screen to be clearer. Regardless of the screen material used, the screen can have an openness factor ranging from about 1% to about 30%, such as from about 2% to about 25%, such as from about 3% to about 20%. For example, the openness factor of the roller blind screen can be 5%, which allows less light to pass through, or it can be 10%, which allows more light to pass through.

Meanwhile, the non-woven backing material can be a hydroentangled/wet laid non-woven material, a spunbond material, a meltblown material, or any other type of non-woven material known to those of ordinary skill in the art. For example, the non-woven backing material can be a wet laid non-woven material formed from a process called hydroentanglement where fine, closely spaced, high velocity jets of water are utilized to entangle loose arrays of fibers into a web. The formed fiber web is supported either by regularly spaced woven forming wires or other another forming surface such as a sleeve with randomly distributed holes. As a result of the impact of the jets, the fibers entangle, forming an integrated web where fibers are held together by friction forces. The fiber-to-fiber friction allows the web to have physical integrity. The resulting fabric strength depends on the fiberweb properties (basis weight, thickness, etc.), fiber parameters (fiber diameter, bending modulus, etc.), forming wire's geometry and jet parameters. This technology can use efficiently the majority of all types of fibers and produce fabrics that can achieve properties equivalent to woven materials.

The non-woven backing material can also be a spunbond material. As used herein, the term "spunbonded or spunbond" refers to small diameter fibers which are formed by extruding molten thermoplastic material as filaments from a plurality of fine, usually circular capillaries of a spinneret with the diameter of the extruded filaments then being rapidly reduced to fibers. Spunbond fibers are generally continuous and have diameters generally greater than about 7 microns, more particularly, between about 10 and about 20 microns.

The non-woven backing material can also be a meltblown material. The term "meltblown" means fibers formed by extruding a molten thermoplastic material through a plurality of fine, usually circular, die capillaries as molten threads or filaments into converging high velocity, usually hot, gas (e.g., air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Meltblown fibers are microfibers which may be continuous or discontinuous with diameters generally less than 10 microns.

Regardless of the method used for forming the non-woven material, the basis weight of the non-woven material can range from about 5 grams per square meter (gsm) to about 100 gsm, such as from about 10 gsm to about 80 gsm, such as from about 25 gsm to 75 gsm. The non-woven material can be formed from natural fibers, synthetic fibers, or a combination thereof. The natural fibers can be made from a material such as wood pulp, while the synthetic fibers can be polyolefin fibers, polyester fibers, or fibers made from post-consumer recycled synthetic materials, although other types of natural and synthetic fibers are contemplated as well. If a combination of natural and synthetic fibers is used, then the non-woven material can include from about 10% to 30% natural fibers and from about 70% to about 90% synthetic fibers by weight of the total non-woven material. The thickness of the non-woven backing material applied to the roller blind screen may vary depending upon various factors, including the type of and amount of polymer that is used to form the adhesive layer on the non-woven backing material. In one embodiment, for instance, the non-woven backing material may have a thickness of from about 0.05 millimeters (mm) (1.97 Mils) to about 0.50 mm (19.69 Mils). For instance, in one embodiment, the non-woven backing material 230 can have a thickness of from about 0.20 mm (7.87 Mils) to about 0.25 mm (9.84 Mils).

The non-woven backing material can be attached to the roller blind screen through the use of an adhesive applied via heat and/or pressure using standard lamination processes, or the non-woven backing material can be attached to the roller blind screen by thermal or ultrasonic bonding. The attachment of the non-woven backing material to the roller blind screen can reduce the amount of light transmitted through the roller blind screen. Various methods of applying an adhesive to the non-woven backing material can be used. In any event, attaching the non-woven backing material to the roller blind screen forms a roller blind laminate material comprising at least two layers: the interior-facing roller blind screen and the exterior-facing non-woven backing material, although it is to be understood that at least a third layer, such as an adhesive layer, may be present. The roller blind laminate material provides a shielded or diffused view through the roller blind assembly and creates a soft ambiance in an interior space or room.

In the use of nonwoven products, if an adhesive is used, it can contribute to the final fabric or material properties. The type of adhesive, the concentration of the adhesive, and its properties contribute to the characteristics of the final nonwoven product. The adhesive can be added to the non-woven backing material after the non-woven backing material is manufactured, such as in the form of a glue web, a paste dot layer, or a glue film. The composition of the adhesive can vary, and by way of example, the adhesive can be a low-VOC polymer such as a polyamide, a polyester, a copolyamide or copolyester. However, base resins used in the adhesive can be almost any thermoplastic. Various hot-melt thermoplastic powders can be used in formulating the adhesive used to adhere the non-woven backing material to the roller blind screen. The types of thermoplastics used can have different melting points, and blends are used as well for even greater variation and range in melting point and melt viscosity. The thermoplastic can be a polyurethane, a polyolefin (such as polypropylene or polyethylene), a polyester, a copolyester, a polyvinyl chloride, a polyamide, or a copolymer thereof. Frequently, polyamide or polyester copolymers are used. When a polyester-based adhesive is used, the adhesive can be activated at a melting temperature of from about 100° C. to 150° C. Dispersions of polyethylene in paraffin waxes can also be used to provide good flow properties and low melting points. Other examples include copolymers of ethylene with either acrylic acid or vinyl acetate. Further, low density polyethylene, with a melting range of 125° C.-140° C.; high density polyethylene, with a melting range of 100° C.-130° C.; or polyvinyl chloride-vinyl acetate copolymer, with a melting range of 120° C.-150° C., can be used. Generally speaking, the melting point of the adhesive is a significant parameter in the adhesive or laminating process, so the adhesive used should be chosen based on the heat resistance and ruggedness of the first material to be coated, such as a non-woven backing material, and the material to which the first material will be applied, such as a roller blind screen.

The adhesive formulation can further include a range of additives, such as plasticizers, thickeners and/or dispersing agents. One component of an adhesive in addition to the thermoplastic powder is typically a water matrix, which is used to form the basic adhesive dispersion. Water is an inexpensive carrier that emits no VOCs. The boiling point of water is generally close to the melting point of most hot-melt powders. Other additives, other than the water, that can be used to change the character of the adhesive include the following: thickeners, dispersing and wetting agents, plasticizers, processing aids (running conditioners), solvents, and other viscosity-influencing substances. Such additives can assist in further adjustments of the melting point of the adhesive.

Thickeners may be used for controlling the adhesive's viscosity during application and for reducing the tendency of the powder to separate from the water matrix. Thickeners are generally high-molecular-weight polymers that become water-swollen gels. Most thickeners provide thixotropic characteristics so that the viscosity is shear-rate dependent. Common thickeners used in adhesive formulations include acrylates, cellulosic derivatives (cellulose esters), polyurethanes and mineral systems such as silicates. For example, with a paste dot adhesive in particular, the adhesive viscosity must be low enough to easily exit the screen holes on application, but must increase immediately after exit to avoid excessive penetration of the substrate or "strike-through."

Dispersing agents can be used in the adhesive to ensure that the thermoplastic powder is uniformly distributed in the water. Ethoxylated fatty alcohols can be used for their low-fogging properties. Those with 3-5 units of ethyleneoxide also disperse hydrophobic powders. The salts of stearic acid and palmitic acid can also be used.

Additionally, wetting agents can be used to provide better wetting of hydrophobic surfaces and improve adhesion. Reduction of surface tension results in saturation of the hydrophobic substrate fibers and thus leads to improved adhesion. One commonly used wetting agent in adhesives is ethoxylated polysiloxane. This is generally used at a concentration of 0.5-1.0% by weight.

Further, plasticizers can be used to reduce the melt temperature and melt viscosity of the adhesive, and improve the adhesive strength of the joint if needed. Only amorphous polymers, such as polyamides, are easy to plasticize. Polyesters, however, which have medium crystallinity, are difficult to plasticize, and highly crystalline polymers, such as polyethylene, cannot be plasticized. Both solid and liquid plasticizers are used in adhesive formulations.

Para-toluenesulfonamide, a solid plasticizer with a melt point of about 140° C., is often used with polyamide hot-melt powders. These plasticizers tend to have very low diffusion rates. Other plasticizers for polyamides include dicyandiamide, urea, hydroxybenzoic acid (either substituted or non-substituted) and phenoldicarbonic acids. Dioctylphthalate can be used as a plasticizer for polyamide or polyesters, however it tends to diffuse out of the coating.

Other agents may be used as additives in adhesive formulation for specific properties, such as the following: anti-blocking agents to reduce adhesion, antioxidants added to thermoplastic formulation to prevent thermal degradation, antistatic agents, antifoaming agents, lubricants and solvents.

The adhesive can be prepared in various ways, such as by adding dispersing agents and anti-foaming agents to water while stirring at 500 rpm. Stirring can then be continued at the same speed while adding the adhesive powder. Plasticizers and wetting agents can then be added while stirring continues. Thickeners can next be added in portions until the desired viscosity is achieved. Stirring may be continued for 30 minutes or until the adhesive formulation is homogeneous, and then the formulation can be applied either to a rotating perforated cylinder via a doctor blade for coating a material, such as a non-woven backing material for use in a roller blind laminate material, or directly to the material to be coated with the adhesive as a glue or film.

The adhesive can be applied in varying amounts to the non-woven backing material, after which the non-woven backing material is laminated to the roller blind screen material, as is discussed in more detail below. If a paste dot adhesive is applied, it can be applied in an amount ranging from about 15 g/m$^2$ to about 35 g/m$^2$. If a glue web adhesive is applied, it can also be applied in an amount ranging from about 15 g/m$^2$ to about 35 g/m$^2$. If a glue film adhesive is applied, it can be applied in an amount ranging from about 2.5 g/m$^2$ to 15 g/m$^2$.

Figure 3:
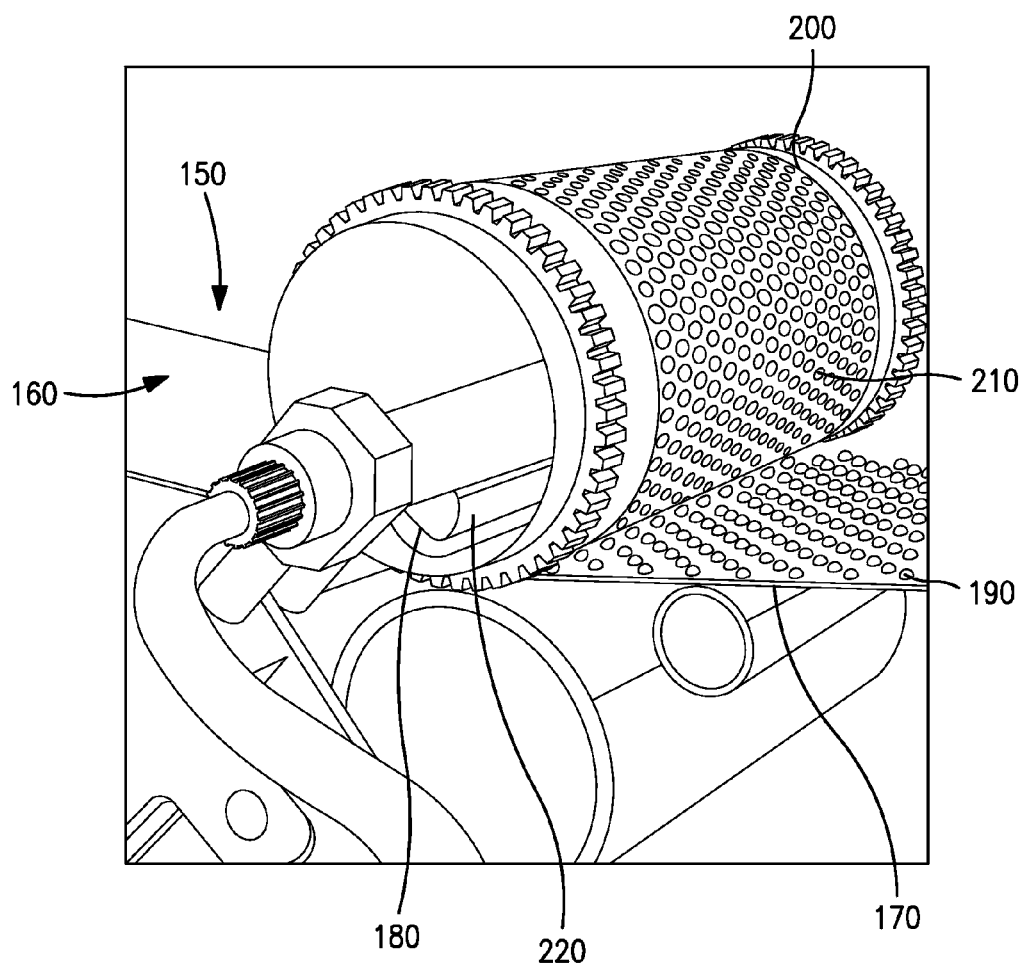
FIG. 3 is a plan view illustrating one method for applying a paste-dot adhesive layer to a non-woven backing material used to form a roller blind laminate material is shown.

Referring to FIG. 3, one method for applying an adhesive 180 to a non-woven backing material 150 is shown. The adhesive 180 can be used for joining the front side 160 of the non-woven backing material 150 with the rear side 140 of the roller blind screen 120 (see FIG. 2). An adhesive 180 is applied to the front side 160 of the non-woven backing material 150 in a manner that results in the deposition of a paste dot adhesive layer 190 on the front side 160 of the non-woven backing material 150. This is accomplished by running the non-woven backing material 150 front side up under a rotating perforated cylinder 200. As the non-woven backing material 150 passes under the rotating perforated cylinder 200, an adhesive 180 is pushed through a screen stencil 210 via a doctor blade 220 that controls the thickness of the adhesive 180 that deposits on the front side 160 of the non-woven backing material 150. In one embodiment, the screen stencil 210 is in the shape of a plurality of dots so that a paste dot adhesive layer 190 is deposited on the non-woven backing material 150 after it passes under the cylinder 200. The amount of paste dot adhesive applied to the non-woven backing material can vary. The paste dot adhesive layer 190 can then be dried, and then the non-woven backing material 150 can be joined to another material, such as a roller blind screen 120, to form the roller blind laminate material 20 (see FIG. 1) of the present disclosure. The process for forming the paste dot adhesive layer and then bonding the non-woven backing material to a roller blind screen is discussed below in more detail.

The use of a paste dot adhesive layer for attaching or bonding nonwovens to themselves and other substrates is generally known as the paste-dot process. An adhesive is applied in the form of dots onto the nonwoven material so that the non-woven material can later be laminated with various materials via the application of heat and pressure. For adhering a nonwoven material to itself or to other materials, a paste-like thermoplastic adhesive dispersion in water is typically used. The thermoplastic material which serves as the adhesive is generally dispersed in water and can be applied by a variety of processes in a predetermined pattern and density. Once applied to a non-woven material, the adhesive can be used to laminate the non-woven material with other textile materials under the influence of heat and pressure.

A powder-dot process also exists wherein the substrate is heated with a heated roller and pressed against an engraved roller, which contains a thermoplastic powder rather than a thermoplastic dispersion in water. The engraved roller transfers the powder in a specific pattern onto the substrate. The paste-dot coating system is generally considered to be a more flexible system than the powder-dot system. It also provides minimum penetration, or strike-through, and greater control in evenness of length and width of application, such as onto a non-woven material. The paste-dot process allows for greater precision in the weight and shape of the dot, as well as the dot pattern applied to a material such as a non-woven material. The use of a paste-dot coating process is effective when working with lightweight substrates such as nonwoven interlinings, which have a low tolerance for high temperatures.

In forming a paste-dot adhesive layer to a non-woven material, thermofusible pastes are applied directly onto the non-woven material with a rotating perforated cylinder or coater. The paste is pumped into a screen stencil inside the rotating perforated cylinder and applied to a non-woven material passing under the cylinder by use of a doctor blade or "squeegee." The paste dot-coated non-woven material is then led through a drying tunnel to remove any water and/or other volatile products.

One advantage of using thermoplastic powders dispersed in water as adhesives is that true spot bonding can be achieved. By selection of particle size and application means, it is possible to deposit discrete dots of adhesive, which results in the least restrictive effect on fiber mobility. As a consequence, fabrics with good strength while maintaining their softness can be manufactured. In this form of bonding, much of the adhesion is due to mechanical interlocking of fibers rather than chemical bonding.

There are many processes by which the paste dot adhesive layer can be applied to a material. As previously discussed, using a rotating perforated cylinder is involved in one common process, known as rotary screen printing. In the rotary screen printing process, an aqueous suspension of finely thermoplastic powder adhesives and additives (the paste) is pressed through the holes of a rotating, perforated cylinder (the screen stencil) onto a cold web of fabric. This procedure is gentle to the material being coated, such as a non-woven backing material, and the range of options for formulating the paste allows for flexibility in the application procedure. The rotary screen printing process is characterized by high and economical coating rates of 30-60 m/min, which can be increased to 90 m/min in certain cases.

The aqueous adhesive dispersion is pumped through a hollow doctor blade, which compresses the adhesive dispersion into the interior of the rotating screen stencil. The viscosity of the paste can be adjusted to allow stencils of either coarse or fine screens to be used, depending on the application and type of material being coated with the paste. The internal adjustable doctor blade presses the paste through the holes of the stencil and onto the web of fabric, which runs over a counter roller coated with hard or soft rubber. The paste dots are then dried, and either circulating air or infrared radiations can be used to sinter the textile web.

Several manufacturers specialize in this type of applicator. Schaetti AG, Switzerland supplies complete coating and laminating systems based on thermofusible adhesives. Their equipment can be used to apply paste dots, but may also be designed for other processes, such as powder-dot, double-dot and scatter coating processes. Evonik Industries, Germany also has technology related to paste dot adhesives.

Note also that the manner by which the adhesive 180, if any, is applied to the front side 160 of the non-woven backing material 150 can vary, although the process of applying a paste-dot adhesive layer 190 is described in detail above. For example, a film or web of adhesive can also be applied to the front side 160 of the non-woven backing material 150. After the non-woven backing material is coated with the adhesive, the non-woven backing material can be applied to the roller blind screen via the use of heat and pressure.

U.S. Pat. No. 7,699,954 describes one process by which a non-woven backing material can be laminated onto a roller blind screen, and is incorporated herein in its entirety by reference thereto for all purposes. However, other methods known to those skilled in the art can also be employed.

One laminator apparatus, for example, can comprise a separate unit with a dual belt-driven, continuous pressure lamination section that utilizes pressure, heat and cooling to bond at least two materials through the use of an adhesive applied between the layers of the substrates (i.e., the non-woven backing material and roller blind screen). Such a separate laminator apparatus can be employed to make a variety of composite and/or reinforced materials. The component parts of the laminate (i.e., the at least two materials) can be a woven fabric material, such as the roller blind screen of the present description; a nonwoven fabric web, such as the non-woven backing material used in the present description; or a mat of fibers. Adhesive materials are used to bond the various materials that ultimately form a laminate construct, such as the roller blind laminate material of the present description. These materials may be melted and remelted repeatedly. When used to laminate yarns, especially polymer yarns, thermoplastic copolyester adhesives are preferred, as these materials may be selected to have a melting temperature below the melting temperature of the yarns. Industrial type laminates that may be formed using the laminator described herein include natural and/or synthetic fabric-based, asbestos-based, glass-based, nylon-based, flame-retardant and/or flame-resistant based, and mixtures thereof. Laminates of other materials may also be prepared as well for use as roller blind materials, which will be appreciated by those having ordinary skill in the field.

Nonwoven fabrics are one class of materials used in the pressure laminator described herein. The adhesive used to bond the nonwoven substrates to other non-woven substrates or other materials such as woven materials can be activated by heat during the lamination process. The combination of the use of pressure, heating to activate the adhesive, and cooling of the joined substrates while still under pressure minimizes shrinkage, sets the yarn or fiber size in the final laminate material, and imparts high strength, including fray resistance characteristics, to the final product. The adhesive, which has been previously applied to the non-woven backing material, is captured between the two layers of laminate material.

Figure 4:
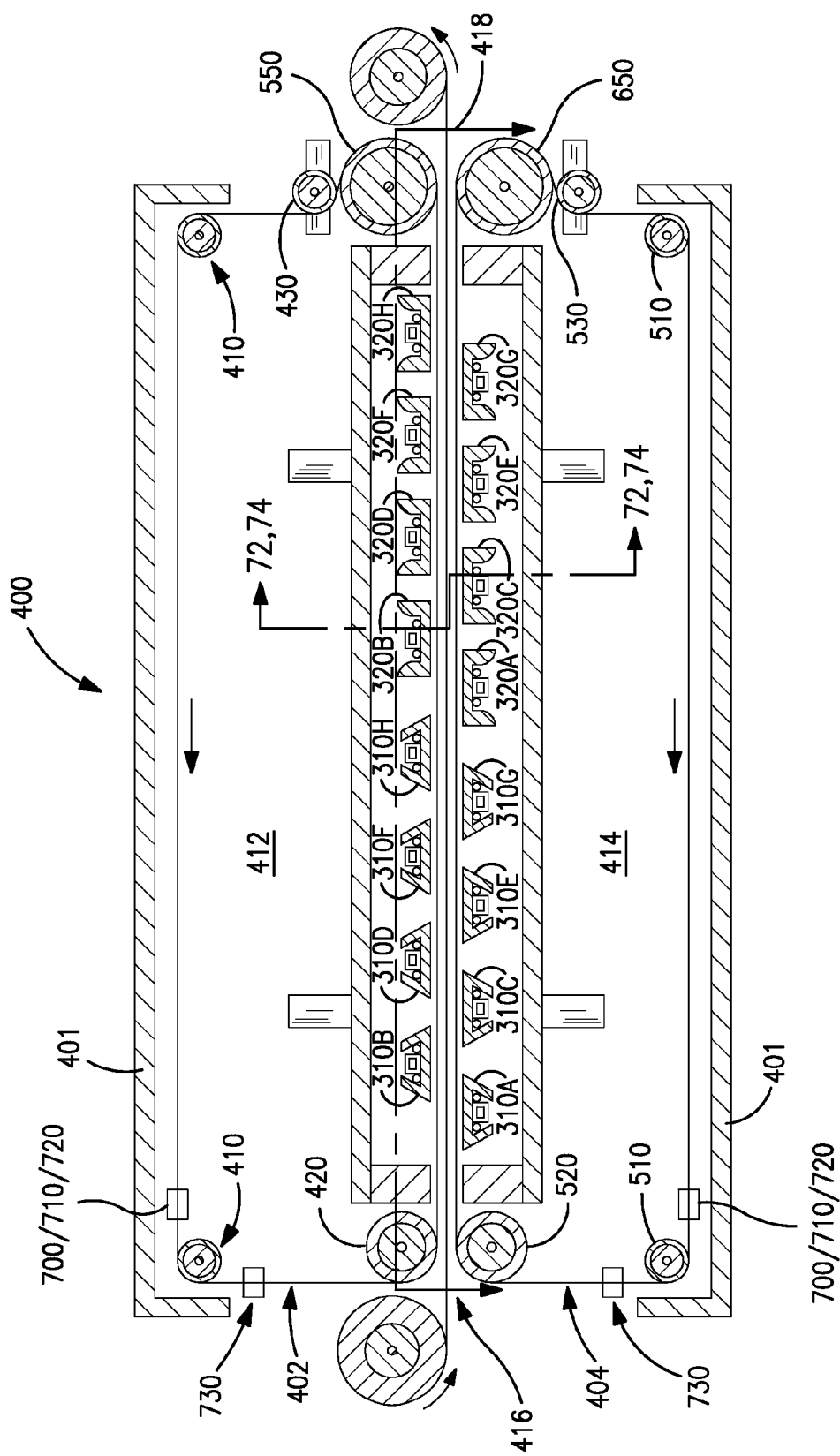
FIG. 4 is a side view of a laminator apparatus used to attach a non-woven backing material to a roller blind screen to form a roller blind laminate material.

Referring to FIG. 4, one embodiment of a laminator apparatus 400 is shown, which is used for pressure bonding nonwoven substrates has an outer housing or frame in which a rectangular pressure box is mounted. However, the shape of the box need not be rectangular. The pressure box comprises two spaced apart sections, an upper section and a lower section, each of which has pressure seals along its four edges, and each of which is further provided with a plurality of both heating and cooling elements. Two counter rotating drive belts, an upper drive belt and a lower drive belt, contact one another at and together run through a space between the two sections of the pressure box. The belts are dimensionally larger (length and width) than the seals of the pressure box. This is necessary to permit pressurization of the box, both above and below the two belts. One belt is driven in a clockwise manner and the other belt is driven in a counterclockwise manner. Once the belts are in motion, one end of the pressure box is the inlet (feed) end and one end is the outlet end of the laminator.

The lower section of the preferred pressure box is mounted rigidly to the frame or housing, whereas the upper section of the pressure box can be adjusted as necessary to permit access to the interior of the box. Normally, the sections are spaced apart sufficiently to permit passage of the drive belts there through under pressure (or in a depressurized state), with or without the materials to be laminated there between. If desired, these positions could be reversed, with the lower section spring mounted against a fixed position upper section.

During the lamination process, multiple types of laminators can be utilized to laminate the layers of materials together, such as with an adhesive. For example, the layers of materials can be passed through a pressure seal at the inlet end of the pressure box, and into the space between the two drive belts. Air pressure applied to the upper and lower sections of the pressure box is used to compress the air-impermeable belts toward one another, creating a diaphragm effect between the belts, thereby compressing the materials situated there between. Movement of the two belts through the pressure box allows for the continuous feeding of the at least two layers of materials and thermoplastic adhesive. Once therein, the at least two layers of materials are nipped or pressed together by the diaphragm effect caused by the pressure applied to the belts. The pressed materials are then heated under pressure, melting and spreading the paste dot adhesive. This allows the layers of material to come close together. The heated layers of material are then cooled, while still under pressure, forming the final laminate, such as a roller blind laminate material. The cooled laminate exits the pressure box through an exit pressure seal, where it is collected as desired. When two or more materials are laminated in this apparatus, the thickness of the laminate at the outlet end of the laminator is less than the combined thickness of the materials and adhesive, as measured at the inlet end of the laminator.

The upper and lower sections of the pressure box are equipped with a plurality of heating and cooling elements, which are used to activate and set the thermoplastic adhesive between the layers of material. Heating and cooling can be accomplished by any means available to one skilled in the art. For example, hot pellets, contact heating bars, radiant heating bars, hot fluids (e.g., oil), hot gases (steam), and the like can be employed. Likewise, cooling fluids (e.g., water), adiabatic cooling methods, cold gases, and the like can be employed. If desired, two separate pressure fluids can be employed, one serving as the heating medium, and the other serving as the cooling medium. A person having ordinary skill in the art can readily devise equivalent pressurization and heating and/or cooling systems given this disclosure.

In one laminator configuration, the plurality of heating and cooling bars located in the lower section of the pressure box are rigidly mounted, whereas the plurality of heating and cooling bars in the upper section of the pressure box are mounted so as to float on top of the materials being laminated. This arrangement has been found to be especially useful in the preparation of nonwoven fabrics. As shrinkage is minimized or eliminated.

Referring to FIG. 4, a number of components of a pressure box 401 that can be used in a laminator apparatus 400 are shown in cross-section. As illustrated, two rotatable belts, top belt 402 and bottom belt 404, can be mounted on a plurality of support rollers (top rollers 410, 420, 430 and bottom rollers 510, 520, 530), and pulled through the pressure box 401 between the upper section 412 and the lower section 414, entering at the inlet end 416 and exiting at the outlet end 418, by their respective drive rollers 550 (top) and 650 (bottom). Alignment of the two rotating belts 402 (top) and 404 (bottom) is maintained by an electric alignment system comprising an alignment carriage 700, alignment pivot 710, electric alignment servo 720 and electric alignment eye 730. If either of the belts moves out of alignment, the electric eye 730 detects the same and activates the alignment servo, which causes the belt to be adjusted as necessary by lateral movement of the alignment carriage 700.

Eight spaced apart radiant heat bars (310A, 310B, 310C, 310D, 310E, 310F, 310G, and 310H) are shown at the inlet end 416 of pressure box 401 and eight spaced apart cooling bars (320A, 320B, 320C, 320D, 320D, 320F, 320G and 320H) are shown at the outlet end 418 of pressure box 401. Four of the heat bars are rigidly mounted in the lower section 414 of the pressure box 401, namely heat bars 310A, 310C, 310E and 310G. The other four radiant heat bars (310B, 310D, 310F and 310H) are flexibly mounted such that they float above the upper belt, permitting materials of varied thickness to pass thereunder. Four of the cooling bars are rigidly mounted in the lower section 414 of the pressure box 401, namely cooling bars 320A, 320C, 320E and 320G. The other four cooling bars (320B, 320D, 320F and 320H) are flexibly mounted such that they float above the upper belt, permitting materials of varied thickness to pass thereunder.

As illustrated, the plurality of heating and cooling bars are preferably arranged in a staggered configuration. Thus, the materials to be laminated are heated from below, then above, then below, etc., and the cooling is accomplished in the same manner; the substrate is cooled from below, then above, then below, etc. This arrangement permits rapid and uniform heating, as well as rapid and uniform cooling of the substrate materials being laminated in the pressure laminator. The uniformity of heating and cooling under pressure leads to improved physical characteristics of the resulting laminates. In the case of nonwoven fabrics laminated in this manner, shrinkage of the fabrics is held to a minimum.

In one laminator apparatus design, at least 75 percent of the belt width is heated and cooled by these elements. For example, on a 29 inch wide belt, the central 22 inches are heated and cooled. On a 76 inch wide belt, the central 60 inches would be heated and cooled. The heat bars can be Reliant ER177A heat bars (England) and each is provided with a thermocouple to measure the temperature delivered to the belts. The cooling bars are each provided with water fed cooling pipes.

The belt can be made of PTFE-impregnated fiberglass, and the thickness of the belt can be modified as desired, depending on the nature of the materials being laminated and the desired operating speed. For laminating nonwoven fabrics, for example, a belt thickness ranging from 2 to 20 mil, such as from 5 to 15 mil, has been found satisfactory. Belts have been operated at 12 feet per minute, with a temperature of from about 100° C. to 150° C. or higher being delivered to the materials being laminated to heat activate the adhesive used. Optimum belt speeds of 50 to 100 feet per minute can be achieved by modification of the belt thickness and/or composition. The optimum belt speed for nonwoven fabric lamination is currently believed to be 60-70 feet per minute. Another way in which to achieve higher speeds is to simply increase the size of the laminator apparatus. The apparatus described herein has a length of about 4 feet. Increasing the size from 2 times to 10 times this size would allow for faster operating speeds.

During the lamination process one or more of the layers of material to be laminated may create a counter-pressure as any entrapped air in the substrates expands. To deal with this counter-pressure, at least one (or both) of the PTFE (Teflon®) impregnated fiberglass drive belts used in the described pressure laminator can be modified on the outside edges to comprise a thick (about 0.125 inch) porous glass fiber mat (not shown). This porous glass fiber mat allows the expanded air from the heated laminate to escape via this sideways (transverse) porosity. Although one embodiment of a laminator apparatus and method for attaching the non-woven backing material to the roller blind screen is discussed above, it is to be understood that multiple types of laminators and methods are contemplated.

After the roller blind screen has been laminated to the non-woven backing material through use of any suitable adhesive and the laminating process described above or any other suitable laminating process, the roller blind laminate material can be cut into desired lengths and widths to become a component of a roller blind system as shown in FIG. 1. Various roller blind screens can be used that have different openness factors to obtain a desired amount of light transmission when laminated with the non-woven backing material, which can be of various base linear densities and thicknesses.

One embodiment of a roller blind assembly made in accordance with the present disclosure is illustrated in FIG. 1. In FIG. 1, the roller blind system 10 is shown with a roller 30 mounted between a left mounting bracket 40 and a right mounting bracket 50. The roller blind laminate material 20 is schematically indicated and can be wound and unwound from the roller by operating the bead chain operating mechanism 80. A telescopic end plug 60 in the right end 30A of the roller 30 can facilitate mounting of the roller. Depressing the end plug 60 can reduce the effective length of the roller 30 making it easy to position between the left mounting bracket 40 and the right mounting bracket 50. Retracting the end plug 60 to its extended position can restore the roller 30 to its previous length, allowing the roller to connect to the left and right brackets by suitable end plugs on either side. A locking ring 70 can prevent the inadvertent depression of the telescopic end plug 60. FIG. 1 also shows a leveler module 90. As can be seen, the locking ring 70 is adjacent the right roller end 30A and thus the plunger (not visible) of the end plug 60 is in its locked position. The left mounting bracket 40 and the right mounting bracket 50 can be mounted to a ceiling surface 110 and the roller 30 can be mounted between them. In order to prevent the roller axis 100 from being lopsided, the leveler module 90 is needed. Adjacent to the right mounting bracket 50 is placed the leveler module 90. By operating the leveler module 90, a range of positions of the right roller end 30A between a lower position and an upper position can be chosen.

Figure 5:
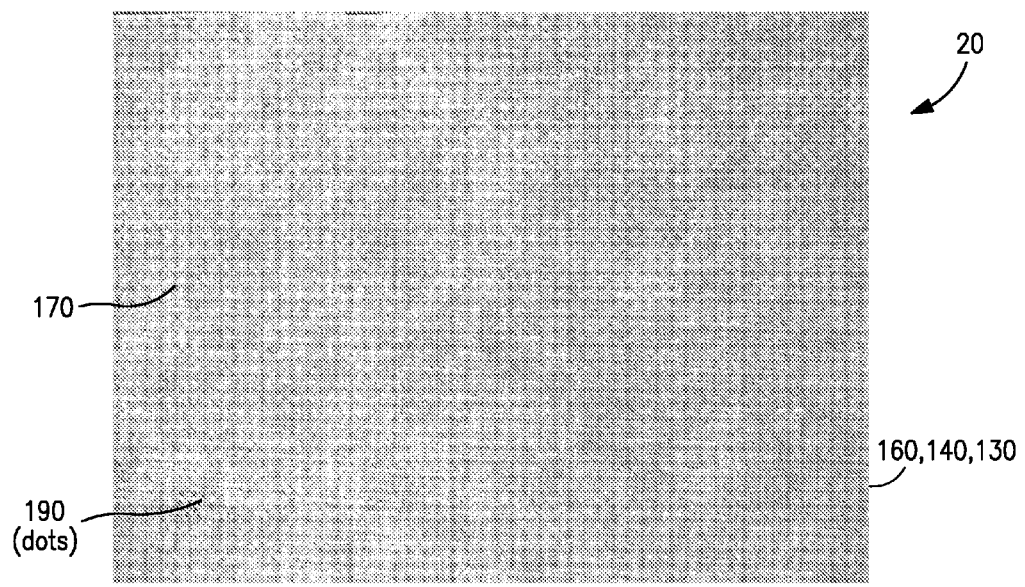
FIG. 5 is a view of the rear side of a roller blind screen with a non-woven backing material applied thereto to form a roller blind laminate material.
Figure 6:
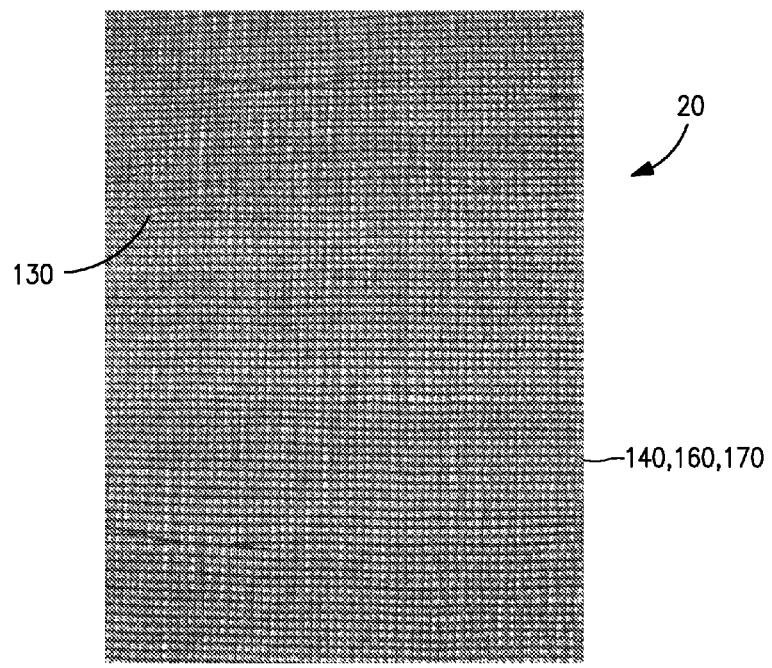
FIG. 6 is an image of the roller blind screen in use with a non-woven backing to form a roller blind laminate material.
Figure 7:
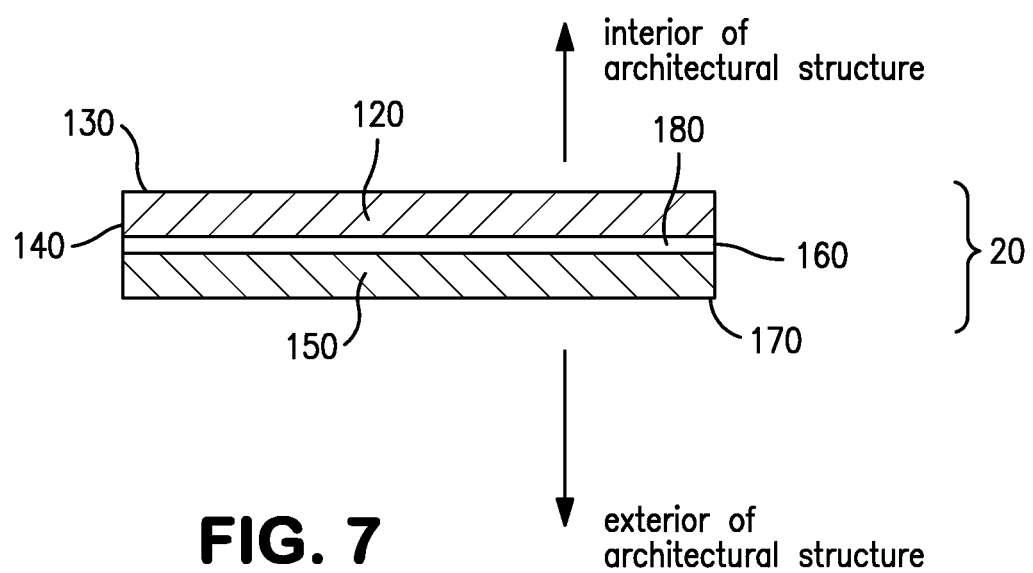
FIG. 7 is a cross-section top view of one embodiment of the roller blind laminate material.

FIGS. 5-7 show various embodiments of the roller blind laminate material 20 used in the roller blind system 10. For example, FIG. 5 shows a non-woven backing material 150 that has been attached to a roller blind screen 120 to form the roller blind laminate material 20. The front side 160 of the non-woven backing material 150, the rear side 140 of the roller blind screen 120, and the front side 130 of the roller blind screen 120 are marked on FIG. 5 for reference purposes but are not visible. Small dots from a paste dot adhesive layer 190 are visible from the rear side 170 of the non-woven backing material 150. Although a paste dot adhesive is shown, it is to be understood that any of number of adhesives can be used to attach the non-woven backing material 150 to the roller blind screen 120, including, but not limited to, the use any adhesive that allows for the non-woven backing to adhere to the roller blind screen via application or pressure and/or heat, such as a glue web or glue film. Additionally, it is to be understood that the use of an adhesive layer is not required.

Referring now to FIG. 6, an image of the front side of one embodiment of the roller blind laminate material 20 is shown where an adhesive is used. The front side 130 of the roller blind screen 120 is shown, and although not visible, the rear side 140 of the roller blind screen 120, the front side 160 of the non-woven backing material 150, and the rear side 170 of the non-woven backing material 150 are marked for reference purposes. The reduction in the amount of light transmission through the roller blind laminate material shown in FIGS. 5 and 6 as compared to a roller blind screen alone changes the lighting in a room where the blind laminate material 20 is used on any architectural openings. The reduction in light can improve the ambiance in a room and give it a softer glow.

Referring to FIG. 7, a top view of the roller blind laminate material 20 is shown. FIG. 7 shows a magnified top view of the roller blind laminate material 20 that is part of the roller blind system 10. Closest to the interior of an architectural structure is the roller blind screen 120, and closest to the exterior of an architectural structure is the non-woven backing material 150. In between the roller blind screen and the non-woven backing material can be an adhesive 180, which can include a paste dot adhesive layer 190 (not shown) or any other suitable adhesive such as a glue web or glue film. The roller blind screen 120 has a front side 130 that faces the interior of an architectural structure, and a rear side 140 that is adjacent to the adhesive 180. The adhesive 180 is then adjacent to a front side 160 of the non-woven backing material 150, while a rear side 170 of the non-woven backing material 150 faces the exterior of an architectural structure.

When the laminate material of FIG. 7 is formed, the light transmission through the roller blind assembly can be reduced compared to the light transmission through the roller blind assembly where the roller blind screen material is used alone. Generally, the light transmission through the roller blind screen alone is from about 10 to about 50 foot-candles, while the light transmission through the roller blind laminate material (roller blind screen, adhesive, and non-woven backing material) is from about 5 to about 40 foot-candles. For example, the light transmission through the roller blind assembly including the non-woven backing material can be reduced by from about 10% to about 70%. If a screen with a 5% openness factor is used in conjunction with the non-woven backing material, the light transmission can be reduced by from about 10% to about 40%. Meanwhile, if a screen with a 10% openness factor is used in conjunction with the non-woven backing material, the light transmission through the roller blind assembly can be reduced by from about 30% to about 70%. Although 5% and 10% openness factors are discussed above, it is to be understood that the openness factor can vary from about 1% to about 30%. However, after a non-woven backing material is applied to the roller blind screen, the resulting roller blind laminate material can have an openness factor ranging from about 0.1% to about 1.5%, such as from about 0.15% to about 1.25%, such as from about 0.2% to about 1%.

In the Example below, light transmission measurements through various screens with and without a non-woven backing adhered thereto are shown.

EXAMPLE 1

Roller blind screens with openness factors of 5% and 10% respectively were laminated with a non-woven backing material comprising 80% synthetic (post-consumer recycled material) fibers and 20% natural (wood pulp) fibers having a basis weight of about 18 g/m$^2$, a thickness of about 0.24 mm (9.5 Mils) and a paste dot adhesive adhered thereto. The materials were laminated by heat and pressure, where the adhesive was activated at a temperature of about 121° C. The light transmission with and without the non-woven backing material applied to the roller blind screen was measured. A light source was placed 4" from the roller blind screen or the roller blind laminate material on the exterior facing side of the roller blind assembly. The light source included four 34 Watt fluorescent bulbs and provided a total of 136 Watts of light. The light meter used to measure the light transmission in foot-candles was placed 6" from the roller blind screen or the roller blind laminate material on the interior facing side of the roller blind assembly. The results are shown in Table 1 below. The light meter used was the Cal-light 400 model from Cooke Corporation.

TABLE 1

| Sample | Light Transmission (in foot-candles) |
| --- | --- |
| 5% screen | 13.0 |
| 5% screen with non-woven (laminate) | 11.5 |
| 10% screen | 35.5 |
| 10% screen with non-woven (laminate) | 23.0 |

As can be seen from the data in Table 1, the addition of a non-woven backing material to a roller blind screen results in a decrease in the light transmission of the roller blind laminate material when compared to the roller blind screen alone. The application of the non-woven backing material to the roller blind screen with a 5% openness factor resulted in an 11.5% decrease in light transmission. Meanwhile, the application of the non-woven backing material to the roller blind screen with a 10% openness factor resulted in approximately a 35% decrease in light transmission.

EXAMPLE 2

Next, several roller blind laminates formed from screens having various openness factors with and without a non-woven backing material applied to either the front side or rear side of the screens were tested according to ASTM E903-96, ASTM E891, and EN 14501:2005 to determine numerous light transmission properties of the roller blind laminate material.

For Example 2, the roller blind screen material was a glass fiber reinforced plastic coated with polyvinyl chloride having various openness factors. The roller blind screen was 35% glass reinforced plastic by weight and 65% polyvinyl chloride by weight. Further, the roller blind screen had a thickness of about 0.300 millimeters and a basis weight of 654.5 grams per square meter (gsm) or 19.3 ounces per square yard (osy). Meanwhile, the nonwoven backing material was formed from 100% polyester and had a basis weight of 65.1 gsm or 1.92 osy. The nonwoven backing material was applied to the roller blind screen material using 20 grams per square meter of paste dot adhesive.

The following light transmission properties were determined, using a Lamboa 950 UV/VIS/NIR spectrophotometer (Perkin-Elmer):

Rs (%)—Solar reflectance of the side of the roller blind facing the sun
 Ts (%)—Solar transmittance
 As (%)—Solar absorptance
 Tv (%)—Light transmittance
 Tuv (%)—Ultraviolet light transmittance
 External SC—External shading coefficient
 External SHGC—External solar heat gain coefficient
 Internal SC—Internal shading coefficient
 Internal SHGC—External solar heat gain coefficient Generally, the solar reflectance refers to the ratio of total solar energy in the full solar wavelength range (including the visible, infrared, and ultraviolet wavelengths; 300-2,500 nanometers) that is reflected outwardly by an architectural screen system (e.g. a glass/screen combination) to the amount of total solar energy falling on the system expressed as a percent. A solar reflectance of 0% indicates that the system absorbs all solar radiation, and solar reflectance of 100% indicates that the system has total reflectivity. The solar transmittance refers to the ratio of the amount of total solar energy in the full solar wavelength range (including the visible, infrared, and ultraviolet wavelengths; 300-2,500 nanometers) that is allowed to pass directly through an architectural structure screen system (e.g., a glass/screen combination) to the amount of total solar energy falling on the system expressed as a percent. The lower the solar transmittance, the cooler objects will be when directly exposed to sunlight passing through the architectural opening. The solar absorptance refers to the ratio of the amount of total solar energy absorbed by an architectural screen system (including the visible, infrared, and ultraviolet wavelengths; 300-2,500 nanometers) to the amount of total solar energy falling on the system expressed as a percent. The solar absorptance is calculated by subtracting the solar reflectance and solar transmittance percentages from 100%.

Meanwhile, the light transmittance refers to the ratio of the amount of total visible solar energy (wavelengths from 380 to 780 nanometers) that is allowed to pass through an architectural structure screen system (e.g., a glass/screen combination) to the amount of total visible solar energy falling on the system expressed as a percent. The lower this percentage is, the greater the glare reduction due to the screen system. The ultraviolet light transmittance refers to the ratio of the amount of total ultraviolet solar energy (wavelengths from 300 to 380 nanometers) that is allowed to pass through an architectural structure screen system (e.g., a glass/screen combination) to the amount of total ultraviolet light energy falling on the system expressed as a percent. The higher this percentage, the greater the risk of fading of objects contained in a room where the screen system is located.

The ratio of the solar heat gain through a given architectural structure screen system (e.g., a glass/screen combination) to the solar heat gain under the same conditions for clear, unshaded double strength window glass. The shading coefficient defines the sun control capability or efficiency of the architectural structure screen system (e.g., a glass/screen combination) relative to a standard window. The external shading coefficient is the coefficient when the screen is placed exterior to a glass window, while the internal shading coefficient is the coefficient when the screen is placed interior to a glass window. Generally, the closer the coefficient is to zero, the greater the solar heat reduction and the more effective the screen system; and the closer the coefficient is to one, the lower the solar heat reduction and the less effective the screen system. This shading coefficient is used to rate the relative effectiveness of a screen system compared to a "standard window," meaning a single pane clear window with double strength glass. However, the industry is moving away from use of the term since a "standard window" is no longer a single pane clear window with double strength glass. Thus, determining the solar heat gain coefficient (SHGC) is another way of quantifying screen performance because it allows for easy comparison of the solar performance of a given system to any other.

Also known as the g-value, the SHGC is the fraction of incident solar radiation that actually passes through a given architectural structure screen system (e.g., a glass/screen combination), including solar energy that is both directly transmitted and that which is absorbed and subsequently released inwardly by re-radiation and conduction. SHGC is expressed as a number between 0 and 1. The lower a system's solar heat gain coefficient, the less solar heat enters a room space. In Table 2, both external (screen placed exterior to an architectural opening/window) and internal (screen placed interior to an architectural opening/window) SHGC values are given. Further, the value is determined for window glazings A, B, C, and D. Glazing A is a 4 millimeter (mm) clear glass with a single glazing, glazing B is a clear double glazing where each glazing is 4 mm with a 12 mm gap between the two glazings that is filled with air, glazing C is double glazing with a low emissivity coating where each glazing is 4 mm with a 16 mm gap between the two glazings that is filled with Argon, and glazing D is a reflective double glazing with a low emissivity soft coating where each glazing is 4 mm with a 16 mm gap between the two glazings that is filled with Argon.

As shown by Table 2 below, the percent solar reflectance increased for all samples that included the non-woven backing material as compared to the screen material alone. Further, a larger increase was found when the non-woven backing material was placed on the rear (exterior-facing) side of the screen material than when the non-woven backing material was placed on the front (interior-facing) side of the screen material. The increase in the percent solar reflectance for the screen having the non-woven backing material laminated thereto indicates that with a non-woven backing material applied thereto, a screen is better able to reflect sunlight, which can result in energy cost savings.

As further shown by Table 2, the percent solar transmittance decreased for all samples that included the non-woven backing material as compared to the screen material alone. A larger decrease was found when the non-woven backing material was placed on the rear (exterior-facing) side of the screen material than when the non-woven backing material was placed on the front (interior-facing) side of the screen material. The decrease in the percent solar transmittance indicates applying a non-woven backing material to a screen decreases the amount of incident solar energy to which objects inside a room are exposed, which results in a cooler room and can lead to energy cost savings, particularly during warmer months, than when no non-woven backing material is applied to the screen. The percent solar absorptance also decreased for all samples that included the non-woven backing material as compared to the screen material alone.

The percent light transmittance also decreased for all samples that included the non-woven backing material as compared to the screen material alone, which can be associated with a reduced amount of glare due to sunlight. Further, the ultraviolet light transmittance also decreased for all samples that included the non-woven backing material as compared to the screen material alone, which indicates that samples containing the non-woven backing material were better able to block out harmful ultraviolet rays form an interior room.

In addition, the external shading coefficient where the screen material was placed on the exterior of an architectural opening decreased for all samples that included the non-woven backing material as compared to the screen material alone. The decrease in the external shading coefficient indicates that the screen material with the non-woven backing exhibits improved solar heat reduction than the screen material alone, which leads to energy savings. The internal shading coefficient where the screen material was placed on the interior of an architectural opening also decreased for all samples that included the non-woven backing material as compared to the screen material alone, which also shows that the addition of the non-woven backing material improves the solar heat reduction capabilities of the screen.

As is also shown below in Table 2, the external solar heat gain coefficient (SHGC) using glazings A-D and the internal solar heat gain coefficient using glazings A-D were decreased when a non-woven backing material was used in addition to a screen material. Such decreases in SHGC indicate that less solar heat enters a room/interior space when a screen placed in an architectural opening such as a window has a non-woven backing material applied thereto.

TABLE 2

| Sample | Color | OF (%) | Side | Rs (%) | Ts (%) | As (%) | Tv (%) | Tuv (%) | External SC | External SHGC A | B | C | D | Internal SC | Internal SHGC A | B | C | D |
|---|---|---|---|---|---|---|---|---|---|---|---|---|---|---|---|---|---|---|
| Sample 1 Screen with Nonwoven Backing | — | 0.15 | Front Rear | 26 39 | 5 4 | 69 57 | 3 3 | 1 1 | 0.22 0.18 | — — | — — | — — | — — | — — | — — | — — | — — | — — |
| Sample 2 Screen without Nonwoven Backing | — | 3.03 | Front Rear | 25 21 | 8 9 | 67 70 | 6 7 | 4 4 | 0.24 0.26 | — — | — — | — — | — — | — — | — — | — — | — — | — — |
| Sample 3 Screen with Nonwoven Backing | — | 0.21 | Front Rear | 15 33 | 2 2 | 83 65 | 2 1 | 1 1 | 0.22 0.18 | — — | — — | — — | — — | — — | — — | — — | — — | — — |
| Sample 4 Screen without Nonwoven Backing | — | 1.48 | — | 12 | 3 | 85 | 2 | 2 | 0.24 | — | — | — | — | — | — | — | — | — |
| Sample 5 Screen with Nonwoven Backing | Black | 0.64 | Front Rear | 5 36 | 9 8 | 86 56 | 9 8 | 7 6 | 0.29 0.22 | 0.26 0.19 | 0.21 0.15 | 0.14 0.10 | 0.11 0.08 | 0.80 0.59 | 0.70 0.51 | 0.67 0.51 | 0.55 0.45 | 0.31 0.28 |
| Sample 6 Screen without Nonwoven Backing | Black | 14.76 | — | 3 | 15 | 82 | 15 | 15 | 0.36 | 0.31 | 0.25 | 0.17 | 0.13 | 0.83 | 0.72 | 0.69 | 0.56 | 0.31 |
| Sample 7 | White | 0.59 | Front | 68 | 21 | 11 | 19 | 9 | 0.25 | 0.22 | 0.19 | 0.15 | 0.10 | 0.39 | 0.34 | 0.36 | 0.35 | 0.25 |

TABLE 2-continued

| Sample | Color | OF (%) | Side | Rs (%) | Ts (%) | As (%) | Tv (%) | Tuv (%) | External SC | External SHGC A | B | C | D | Internal SC | Internal SHGC A | B | C | D |
|---|---|---|---|---|---|---|---|---|---|---|---|---|---|---|---|---|---|---|
| Screen with Nonwoven Backing | | | Rear | 69 | 23 | 8 | 21 | 11 | 0.26 | 0.23 | 0.20 | 0.16 | 0.11 | 0.39 | 0.34 | 0.36 | 0.35 | 0.25 |
| Sample 8 Screen without Nonwoven Backing | White | 15.36 | — | 62 | 28 | 10 | 26 | 17 | 0.32 | 0.28 | 0.25 | 0.19 | 0.13 | 0.45 | 0.39 | 0.40 | 0.37 | 0.26 |

The modifications described above and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed is:

1. A roller blind assembly, comprising:
   a roller blind mounting system;
   a rotating mandrel; and
   a roller blind laminate material configured to retract and extend by winding and unwinding on said rotating mandrel, said roller blind laminate material comprising a roller blind screen laminated to a non-woven backing material;
   wherein:
   said roller blind screen comprises from about 10% to about 60% by total weight of said roller blind screen of a glass fiber reinforced plastic and from about 40% to about 90% by total weight of said roller blind screen of polyvinyl chloride;
   said non-woven backing material comprises a non-woven fabric formed from polyester fibers; and
   said non-woven backing material diffuses a view through said roller blind laminate material by an amount of from about 10% to about 70%.

2. A roller blind assembly as defined in claim 1, wherein said glass fiber reinforced plastic has a basis weight of from about 100 grams per square meter (gsm) to about 1000 gsm.

3. A roller blind assembly as defined in claim 1, wherein said roller blind screen has an openness factor of from about 1% to about 30%.

4. A roller blind assembly as defined claim 1, wherein said non-woven fabric is formed from at least one of hydroentangled polyester fibers, spunbond polyester fibers, or meltblown polyester fibers.

5. A roller blind assembly as defined in claim 1, wherein said non-woven fabric is formed substantially entirely from said polyester fibers.

6. A roller blind assembly as defined in claim 1, wherein said non-woven fabric comprises natural fibers in an amount of from about 10% to about 30% by weight and polyester fibers in an amount of from about 70% to about 90% by weight.

7. A roller blind assembly as defined in claim 6, wherein said natural fibers comprise wood pulp.

8. A roller blind assembly as defined in claim 1, wherein said non-woven backing material has a basis weight of from about 5 gsm to about 100 gsm.

9. A roller blind assembly as defined in claim 1, wherein said roller blind screen has a thickness of from about 0.05 millimeters to about 0.50 millimeters, and said non-woven backing material has a thickness of from about 0.05 millimeters to about 0.50 millimeters.

10. A roller blind assembly as defined in claim 1, further comprising an adhesive layer disposed between said roller blind screen and said non-woven backing material, wherein said adhesive layer comprises a paste dot layer, a glue web, or a glue film.

11. A roller blind assembly as defined in claim 10, wherein said adhesive layer is applied to a front side of said non-woven backing material in an amount of from about 2.5 gsm to about 35 gsm.

12. A roller blind assembly as defined in claim 11, wherein said non-woven backing material is attached to said roller blind screen by contacting said front side of said non-woven backing material with a rear side of said roller blind screen, wherein heat and pressure are applied to said roller blind screen and said non-woven backing material to form said roller blind laminate material, and further wherein said adhesive layer is melted to attach said non-woven backing material to said roller blind screen.

13. A roller blind assembly as defined in claim 10, wherein said adhesive layer comprises a thermoplastic powder and a water matrix.

14. A roller blind assembly as defined in claim 13, wherein said thermoplastic powder comprises a polyurethane, a polyolefin, a polyester, a copolyester, a polyvinyl chloride, a polyamide, or a copolymer thereof.

15. A roller blind assembly as defined in claim 2, wherein said roller blind screen has an openness factor of about 5%, wherein the light transmission through said roller blind laminate material is reduced by an amount of from about 10% to about 40% compared to said roller blind screen alone.

16. A roller blind assembly as defined in claim 2, wherein said roller blind screen has an openness factor of about 10%, wherein the light transmission is reduced by an amount of from about 30% to about 70% compared to said roller blind screen alone.

17. A roller blind assembly as defined in claim 1, wherein the light transmission through said roller blind screen is from about 10 to about 50 foot-candles, while the light transmission through said roller blind laminate material is from about 5 to about 40 foot-candles.

18. A roller blind assembly as defined in claim 1, wherein said non-woven backing material provides a reduction in a solar heat gain coefficient of said roller blind assembly of from about 10% to about 50% as determined through a section of clear glass having a width of 4 millimeters.

19. A method of forming a roller blind assembly comprising a roller blind laminate material configured to retract and extend, said roller blind laminate material comprising a roller blind screen laminated to a non-woven backing material, said roller blind screen comprises from about 10% to about 60% by total weight of said roller blind screen of a glass fiber reinforced plastic and from about 40% to about 90% by total weight of said roller blind screen of polyvinyl chloride, said non-woven backing material comprises a non-woven fabric formed from polyester fibers, and said non-woven backing material diffusing the view through said roller blind laminate material by an amount of from about 10% to about 70%, said method comprising:
- laminating said non-woven backing material to said roller blind screen to form said roller blind laminate material; and
- cutting said roller blind laminate material to a desired length and width for use within the roller blind assembly.

20. A roller blind assembly as defined in claim 1, wherein said roller blind screen comprises from about 50% to about 80% by total weight of said roller blind screen of polyvinyl chloride.

21. A roller blind assembly as define in claim 1, wherein said glass fiber reinforced plastic is coated with polyvinyl chloride.

\* \* \* \* \*